(12) United States Patent
Toye

(10) Patent No.: US 6,598,735 B1
(45) Date of Patent: Jul. 29, 2003

(54) LIVE ROLLER CONVEYORS

(75) Inventor: Edward William Toye, Kidderminster (GB)

(73) Assignee: Conveyor Units Limited, Worchestershire (GB)

( * ) Notice: Subject to any disclaimer, the term of this patent is extended or adjusted under 35 U.S.C. 154(b) by 0 days.

(21) Appl. No.: 09/595,544

(22) Filed: Jun. 16, 2000

(30) Foreign Application Priority Data

Dec. 2, 1999 (EP) .............................. 99309698
Dec. 2, 1999 (GB) .............................. 9928385

(51) Int. Cl.[7] .............................. B65G 13/06
(52) U.S. Cl. .............................. 198/781.06; 198/781.08
(58) Field of Search .............................. 198/781.08, 781.06

(56) References Cited

U.S. PATENT DOCUMENTS 4,355,715 A   10/1982   Chorlton
4,819,788 A * 4/1989   Van Der Schie
5,042,644 A * 8/1991   Davis
5,217,109 A * 6/1993   Youren

FOREIGN PATENT DOCUMENTS

EP   0 885 818 A   12/1998
GB   2253827       9/1992
GB   2 286 572 A   8/1995

* cited by examiner

Primary Examiner—D. Glenn Dayoan
Assistant Examiner—Scott Carpenter
(74) Attorney, Agent, or Firm—Marshall, Gerstein & Borun

(57) ABSTRACT

The invention relates to a live roller conveyor comprising a plurality of rollers driven by friction drive from a main drive shaft wherein at least some of said rollers are driven from the main drive shaft through a secondary drive shaft and there being control means to vary the torque transmitted between the main drive shaft and the secondary drive shaft.

22 Claims, 18 Drawing Sheets

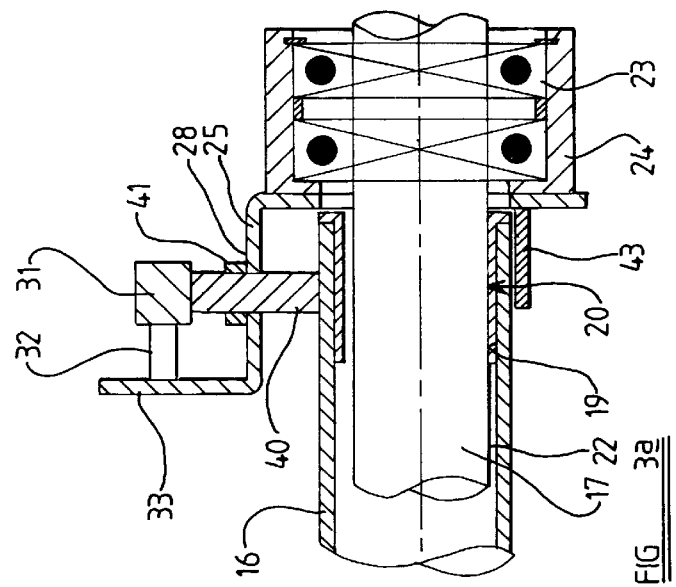
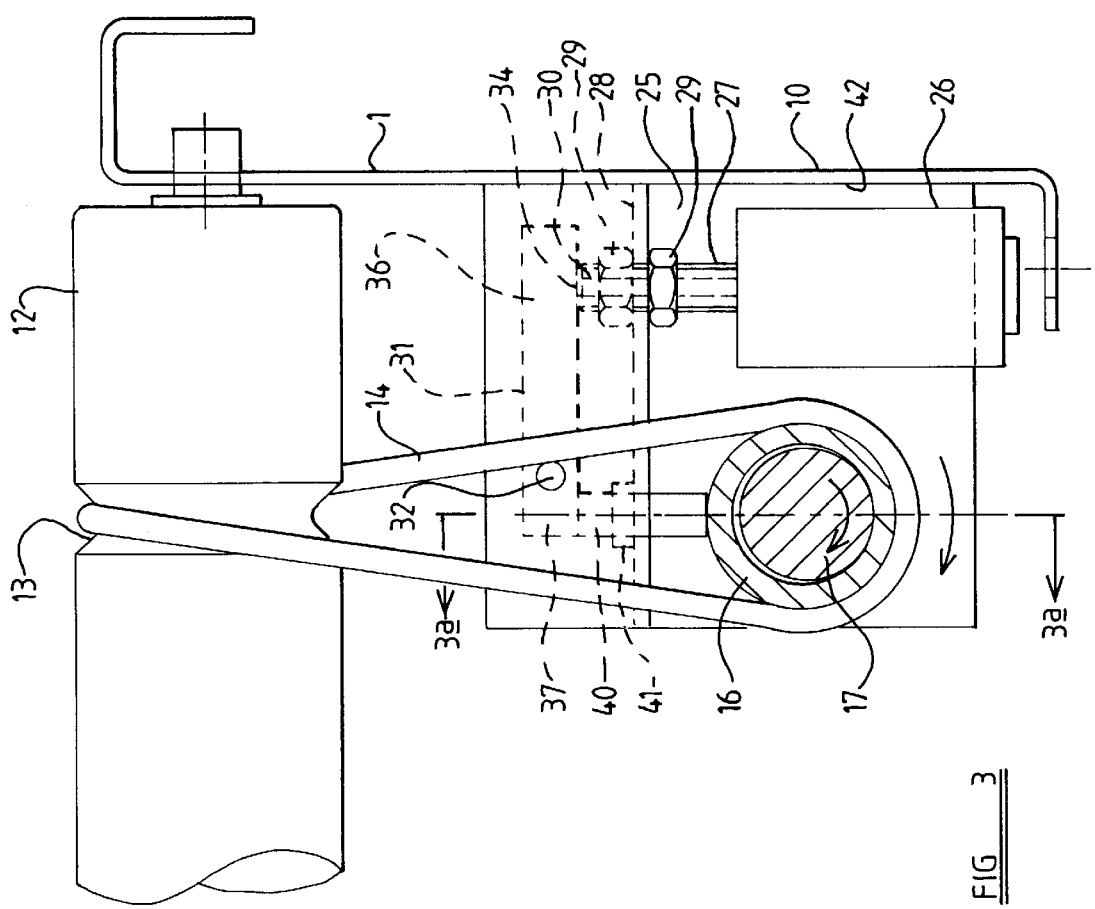

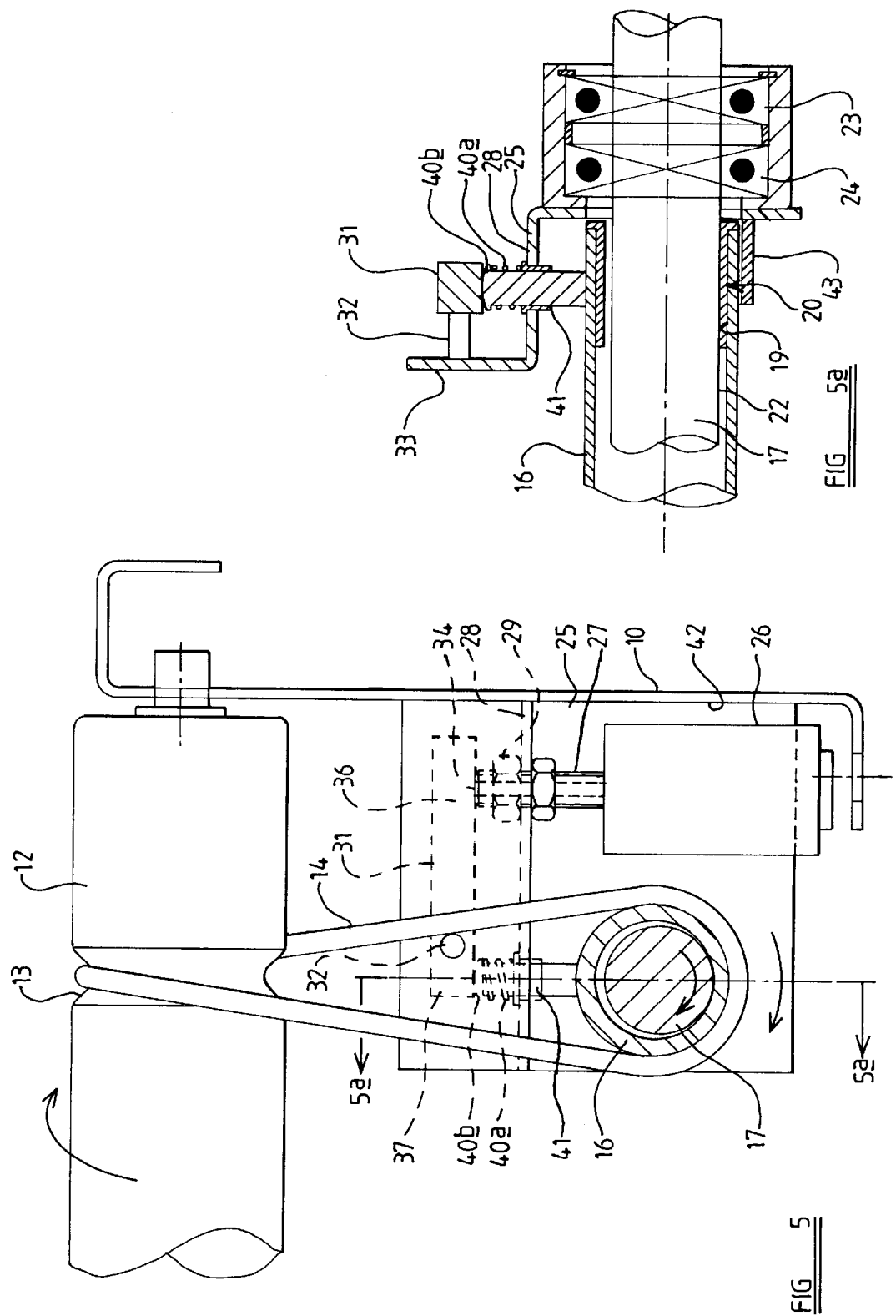

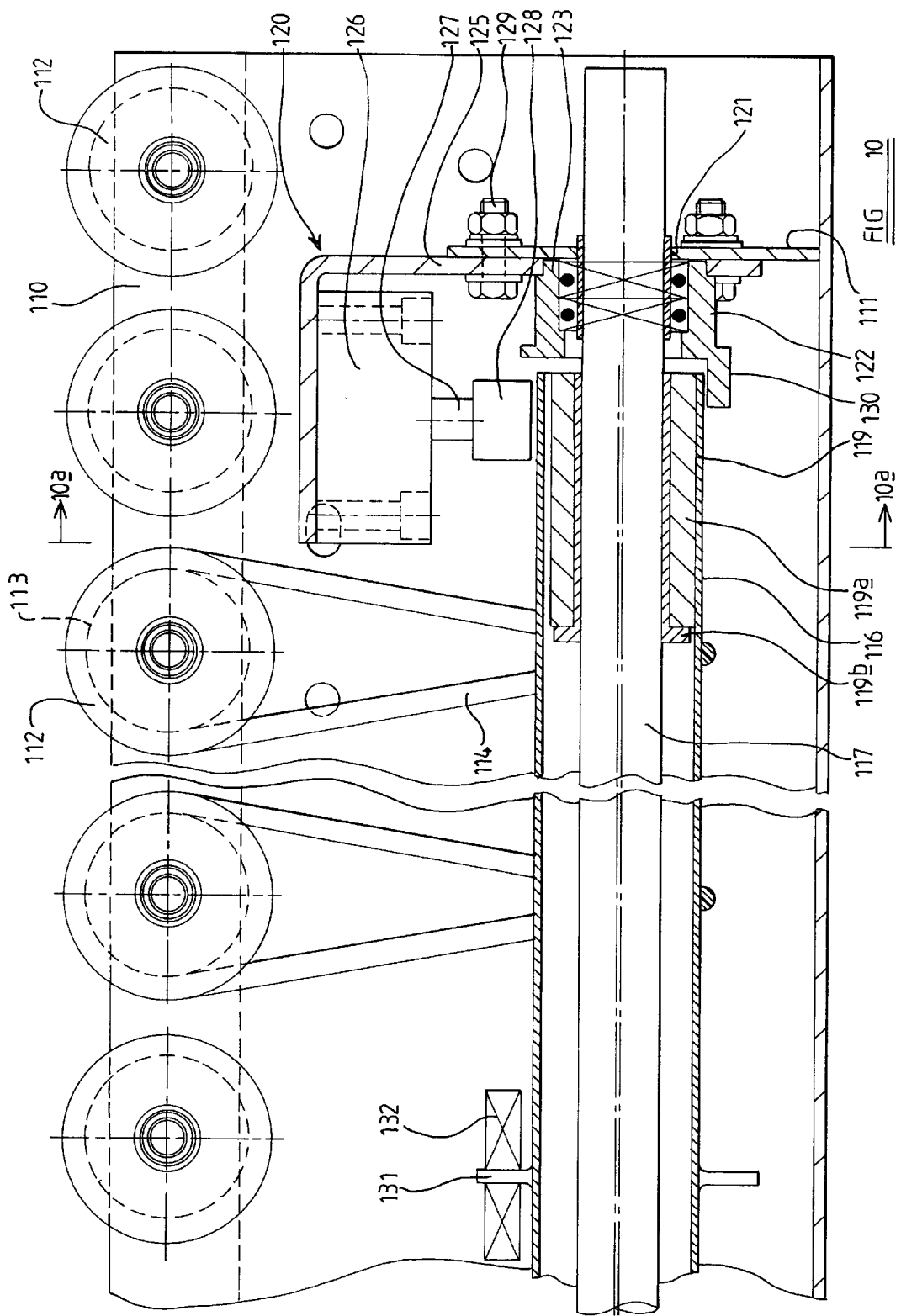

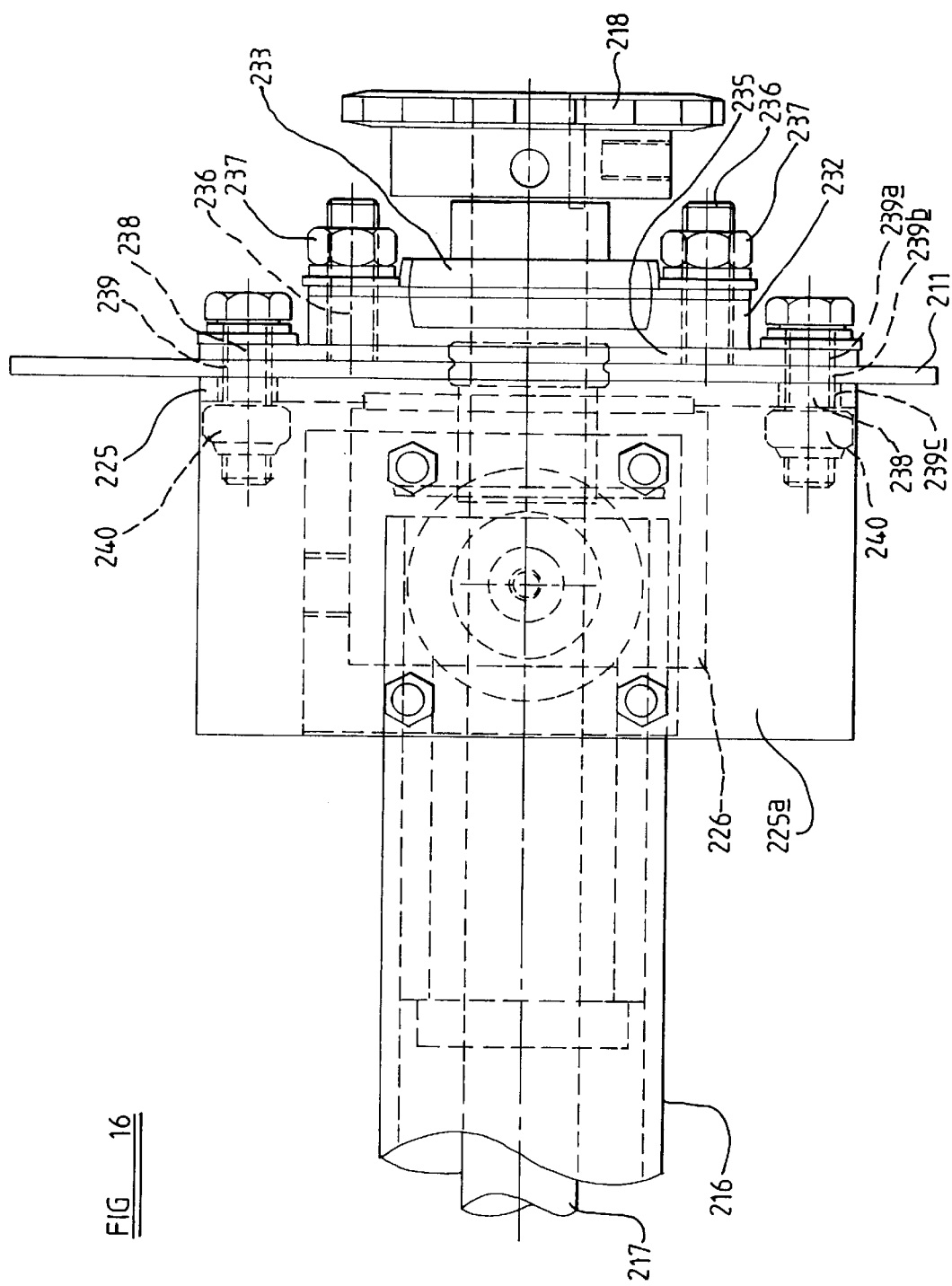

LIVE ROLLER CONVEYORS

BACKGROUND TO THE INVENTION

The invention relates to a live roller conveyor comprising a plurality of rollers driven by friction drive from a main drive shaft wherein at least some of said rollers are driven from the main drive shaft through a secondary drive shaft and there being control means to vary and/or remove the torque transmitted between the main drive shaft and the secondary drive shaft.

For example, when articles are accumulated on such a conveyor by adjustment of a drive force, and/or by engagement with an arresting means at an arresting station, an undesirably high end load on the article and/or the arresting means may be avoided. Such a live roller conveyor is disclosed in GB-B-2,286,572.

SUMMARY OF THE INVENTION

An object of the present invention is to provide such a live roller conveyor in which the control means for adjusting and/or removing the drive force is improved.

According to the present invention we provide a live roller conveyor comprising a plurality of rollers driven by friction drive from a main drive shaft wherein at least some of said rollers are driven from the main drive shaft through a secondary drive shaft and there being control means to vary the torque transmitted between the main drive shaft and the secondary drive shaft, wherein the main drive shaft is disposed within the secondary drive shaft, said secondary drive shaft being movable relative to the main drive shaft so as to vary torque transmitting frictional engagement therebetween.

The secondary drive shaft may be displaced out of driving engagement with the main drive shaft by movement of the secondary drive shaft in a downward direction transversely relative to the main drive shaft.

The secondary drive shaft may be moved relative to the main drive shaft by a control means.

Said movement of the secondary drive shaft may be as a result of engagement of the secondary drive shaft by an actuating member of the control means.

The control means may comprise a support and said actuating member may be movable relative to said support.

The support may comprise bearings which engage the main drive shaft.

Limit means may be provided to limit movement of the secondary drive shaft relative to the main drive shaft.

The limit means comprise a stop member fixed relative to the support and engageable by the secondary drive shaft to limit movement thereof relative to the main drive shaft.

The stop member may have a surface engagable by the secondary drive shaft which is part-circular and concentric with the longitudinal axis of the main drive shaft.

Where the support means comprises bearings, the stop means may be held generally concentric with said main drive shaft by virtue of the engagement of the bearings with the main drive shaft.

The limit means may alternatively comprise means to limit movement of the actuating member.

According to a first embodiment of the invention, the control means may be carried on the main drive shaft.

The control means may be prevented from rotation with the main drive shaft.

The control means may be prevented from rotation with the main drive shaft by engagement of a portion of the control means with a frame member on which the main drive shaft and the rollers are rotatably carried.

The support means may engage said frame member.

The frame member may extend generally parallel to the longitudinal axis of the main drive shaft.

Alternatively the frame member may extend transversely to the longitudinal axis of the main drive and the control means may be movably attached to said frame member.

The control means may be movably attached to said transverse member by bolts received in apertures in the control means, said apertures having a larger diameter than said bolts.

It will be apparent that bolts could alternatively be provided on the control means received in apertures in the transverse member.

Where the conveyor comprises a frame, in a second embodiment of the invention the control means may be fixed relative to the frame.

Where the frame comprises a member transverse to the longitudinal axis of the main drive shaft, the support may be fixed to said transverse member.

According to a first alternative of said second embodiment of the invention, said bearings may support the main drive shaft.

According to a second alternative of said second embodiment of the invention or to the first embodiment of the invention, the conveyor may comprise a further bearing wherein the main drive shaft is supported in said further bearing.

Said further bearing may be a self aligning bearing.

Where the conveyor comprises a frame having a transverse member, said further bearing may be fixed to said transverse member.

In either embodiment of the invention, the actuating member may be driven by an actuating means of the control means.

The actuating means may comprise a fluid operated cylinder or a solenoid.

Movement of the actuating member may be limited either directly or indirectly by limiting movement of the lever of the actuating means.

The actuating means may be carried on said support.

The actuating member may be driven by the actuating means through a lever pivotally connected to the support, particularly when the actuating means is a solenoid.

The actuating member may alternatively be driven by the actuating means by virtue of the actuating means acting directly on the actuating member, particularly when the actuating means is fluid operated.

The actuating member may comprise an end part of, or an element attached to, a piston of a fluid operated actuating means.

The secondary drive shaft may be moved relative to the main drive shaft by two control means disposed at longitudinally spaced positions of the secondary drive shaft.

Said longitudinally spaced positions may be adjacent opposite ends of the secondary drive shaft.

The secondary drive shaft may be movable between a position in which the axes of rotation of the drive shafts are mutually offset and a position in which the axes are coaxial or substantially coaxial to vary the frictional torque transmission therebetween.

The roller may be rotatably mounted on a frame so as to extend generally transversely to the direction of advance of an article to be conveyed thereby whilst the main drive shaft is also mounted on the frame but in a direction so as to extend generally longitudinally of said direction of advance of the articles.

The friction drive means for at least some of said rollers may comprise an elastomeric belt engaged with a roller and with the secondary drive shaft either directly or through an intermediate member which is frictionally rotatably mounted on the secondary drive shaft.

The live roller conveyor may comprise others of said plurality of rollers which are driven from the main drive shaft by a friction drive means which comprises an elastomeric belt engaged with each of such other rollers and with the main drive shaft either directly or though an intermediate member fictionally rotatably mounted on the main drive shaft.

The secondary drive shaft may comprise further alignment means.

The further alignment means may comprise a disc attached to said secondary drive shaft and extending transversely to the longitudinal axis thereof, said disc being receiving in bearings attached relative to a frame of the conveyor.

The invention will now be described with reference to the accompanying drawings in which:

BRIEF DESCRIPTION OF THE DRAWINGS

FIG. 3 is a fragmentary section, to an enlarged scale, on the line 3—3 of the figure of FIG. 2 showing the conveyor in a torque transmitting position;

FIG. 3a is a section on the line 3a—3a of FIG. 3;

FIGS. 5 and 5a are figures similar to FIGS. 3 and 3a but of another embodiment of the invention;

FIGS. 7 and 7a are figures similar to FIGS. 3 and 3a but of a further embodiment of the invention;

FIGS. 8 and 8a are figures similar to FIGS. 7 and 7a but showing the conveyor in a non-torque transmitting position;

FIGS. 10 and 10a are figures similar to FIGS. 9 and 9a but showing the conveyor in a torque transmitting position;

FIG. 16 is a plan view of the part of the conveyor of FIGS. 13 and 14.

DESCRIPTION OF THE PREFERRED EMBODIMENTS

Figure 1:
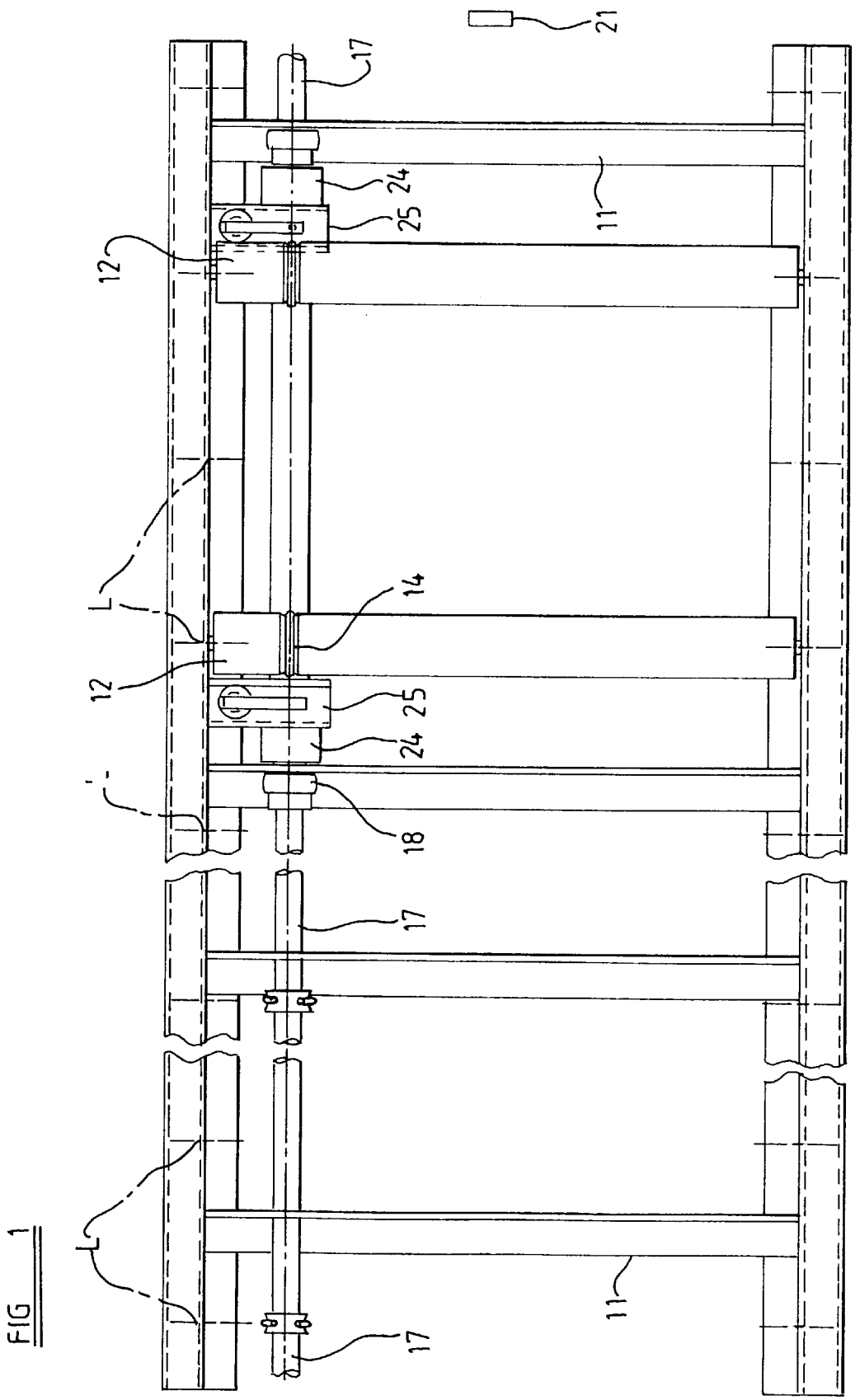
FIG. 1 is a plan view, partly broken away and with parts omitted, of a live roller conveyor according to a first embodiment of the invention.

Referring to FIGS. 1 to 4a of the drawings, an accumulation station of a powered roller conveyor according to a first embodiment of the invention is illustrated and comprises a frame having a pair of side members 10 interconnected by transversely extending members 11 with a plurality of driven cylindrical rollers 12 rotatably mounted between the side members 10 at locations indicated at L. The rollers define a conveying surface S for articles to be conveyed by a conveying force applied to the articles by the rollers 12. The rollers 12 are provided with a part-circular circumferential groove 13 in which is received an elastomeric belt 14 of circular cross-section and engaged with a secondary shaft 16.

The load on the belt 14 is such that friction is exerted between the shaft 16 and the belt 14 to such an extent as to provide a drive to the rollers 12 from the shaft 16 through the belts 14. If, however, any one or more of the rollers 12 is prevented from rotation then slipping occurs between the belt 14 and the rollers 12 and/or the shaft 16 to permit continued rotation of the secondary shaft.

If desired pulleys, shown in dotted line at 15, may be mounted on the secondary shaft 16. If provided, the pulleys 15 are fixed to the shaft 16. If pulleys 15 are provided the slippage occurs between the belts 14 and the pulleys 15 and/or the rollers 12.

Figure 4A:
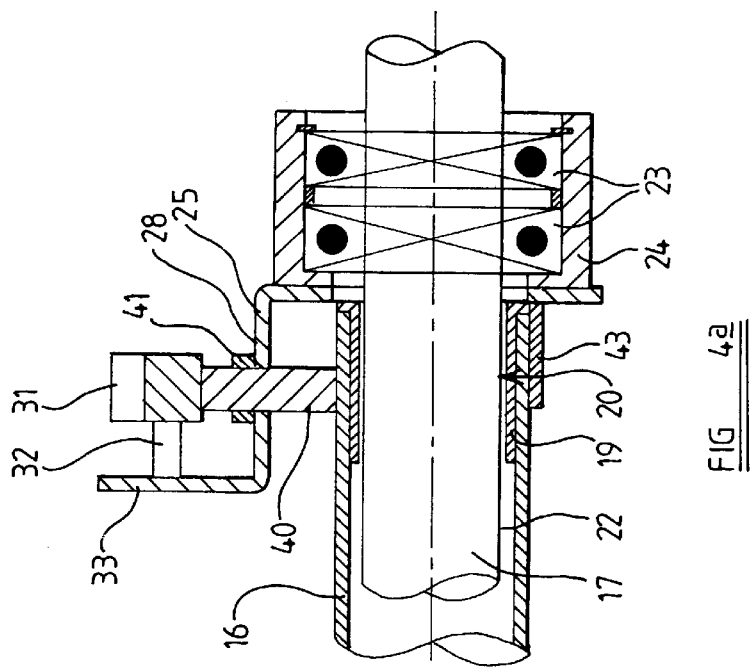
FIGS. 4 and 4a are figures similar to FIGS. 3 and 3a respectively but showing the conveyor in non-torque transmitting position.
Figure 4:
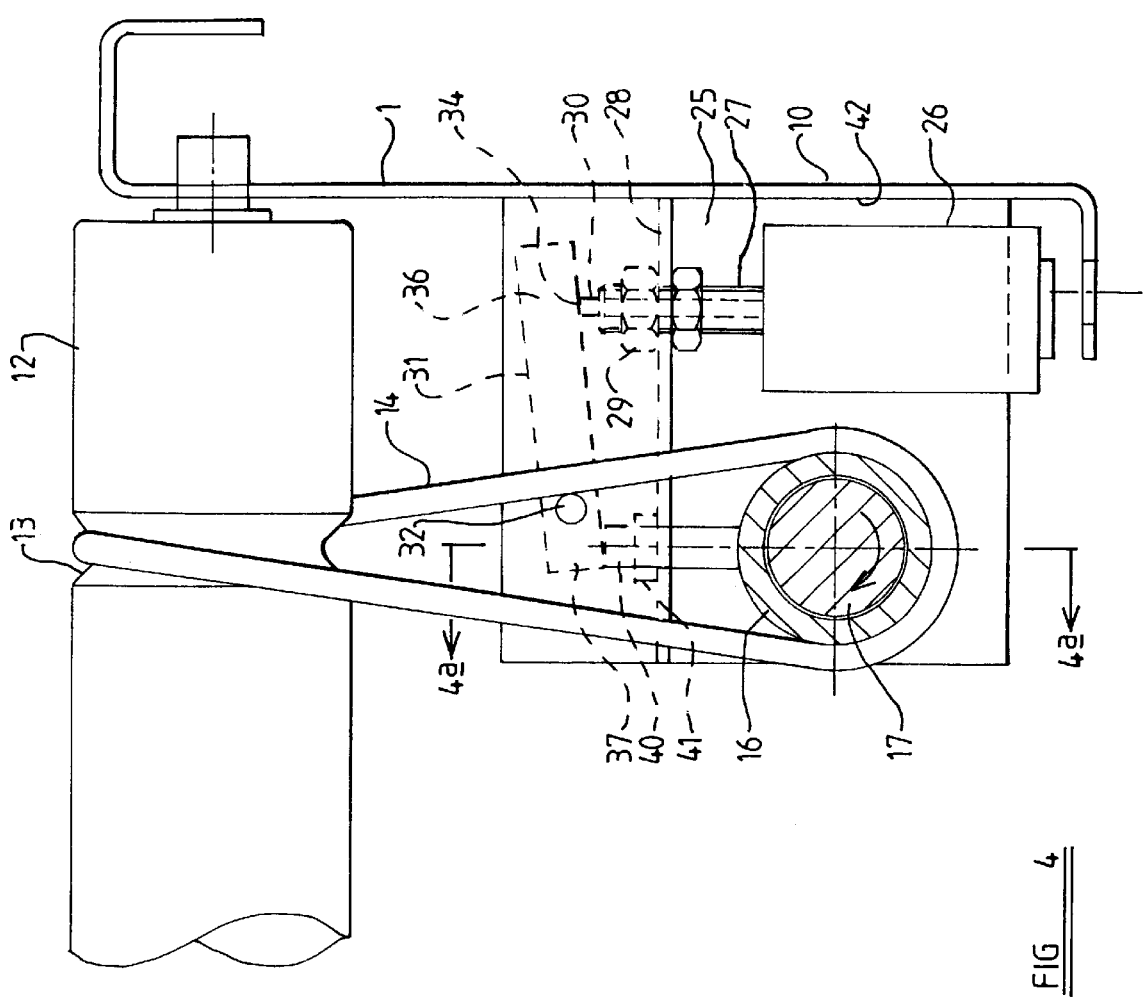

The secondary shaft 16 is tubular and as best shown in FIGS. 4 and 4A is a clearance fit on a main drive shaft 17 which is carried in bearings 18 mounted on the cross members 11 to mount the main drive shaft 17 for rotation about a fixed longitudinally extending axis In the current example the shaft 17 is a solid shaft but it may, if desired, be a tubular shaft.

A bush 19 is provided at each end of the secondary shaft 16 and is made of polyacetal or clewthane or other suitable material to provide a friction drive means 20 between the main drive shaft 17 and the secondary drive shaft 16

The main drive shaft 17 extends through joints, universal as necessary, provided along the whole length of the conveyor and is provided, except at the accumulation station or stations of the conveyor with belts 14, and if desired further pulleys 15', similar to the pulley 15 described hereinbefore, are provided to drive the remaining rollers of the conveyor although of course the belts and pulleys 15' are suitably adapted to the smaller diameter of the shaft 17 in these regions. If desired, alternatively, in these regions the shaft 17 may be made of the same diameter as the shaft 16 and so may be provided with pulleys 15.

The conveyor may be provided with any desired number of accumulation stations and each accumulation station may have one or more secondary shafts 16, the or each shaft 16 may be of any desired length and may drive any desired plurality of rollers. If desired, one or more rollers at an accumulation station may be undriven or may be driven as above described from the main drive shaft 17. The pattern of rollers which are driven from the secondary shaft 16 and which are either undriven and/or driven from the main drive shaft 17 may be arranged as desired for any particular conveyor application.

A suitable sensing device is provided to sense the presence of the or any desired number of articles at an accumulation station. The sensing means then causes the drive means 20 to disengage the drive between the main drive shaft 17 and the secondary shaft 16.

Figure 2:
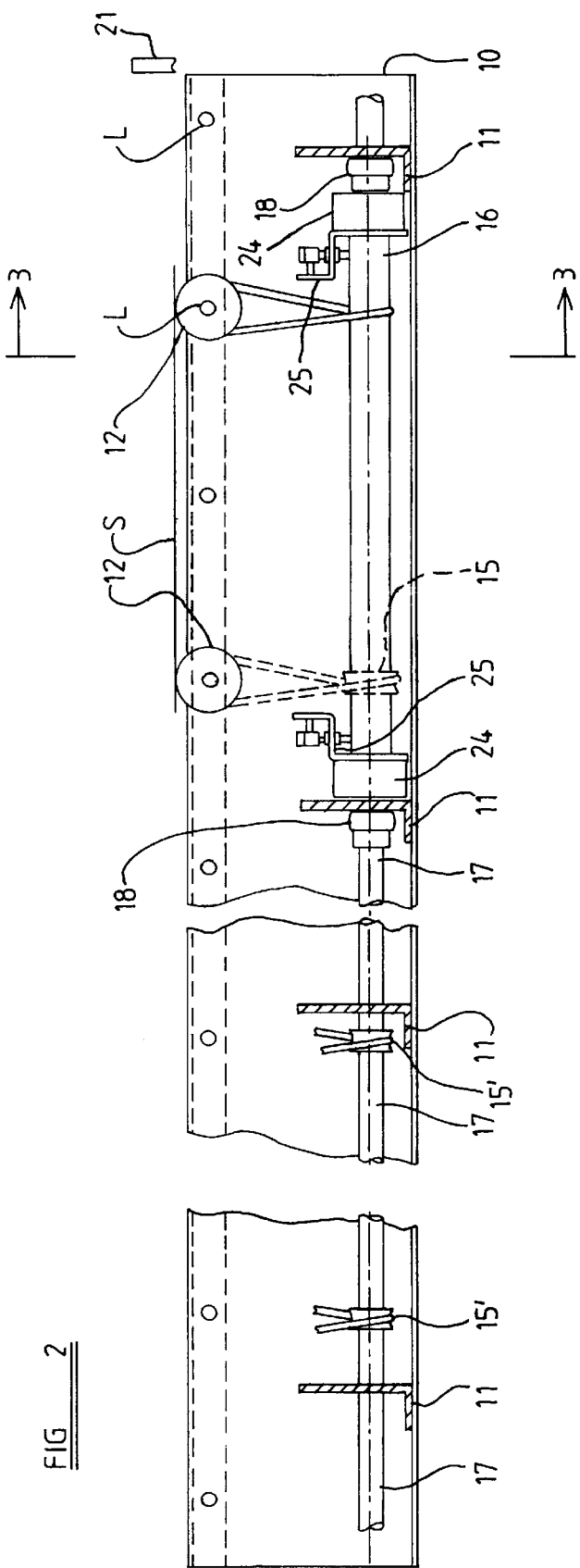
FIG. 2 is a side elevation of the conveyor of FIG. 1.

The conveyor may be provided with an arresting means in the form of a stop 21 movable into an operative position as shown in FIGS. 1 and 2. When the stop is in its operative position, and an article may be moved into engagement with the stop, or a desired plurality of articles may be moved successively into engagement with each other with the loading article engaging the stop.

The length of each section of the accumulation station over which a secondary shaft extends may be varied as desired to cover any desired number of articles. The number of articles over which a secondary shaft extends will depend upon the maximum end load it is desired to exert upon the articles themselves or upon a stop 21 when provided.

Referring now particularly to FIGS. 3 and 3a, the drive means 20 comprises the bush 19 fixed to rotate with the secondary shaft 16 and engageable with the external surface 22 of the main drive shaft 17.

In order to enable the secondary drive shaft 16 to move relative to the main drive shaft 17 the main drive shaft 17 is provided with a pair of ball or roller bearing 23 the outer races of which are engaged with a tubular housing 24 which is fixed, for example by welding, to a support member 25. The support member 25 carries a solenoid 26 having an externally threaded mounting part 27 so that the solenoid 26 is carried by the support 25 by virtue of a horizontal part 28 thereof being clamped between nuts 29 of the threaded stem 27. Movable under the influence of the solenoid within the threaded stem 27 is an armature 30 which engages a lever 31 pivoted towards one end thereof by an axle 32 to an upwardly extending part 33 of the support 25. The lever 31 is caused to pivot about the axis of the axle 32 by engagement of an end 34 of the armature 30 with a first end 36 of the lever 31 so that the opposite end 37 of the lever is caused to move in the opposite direction and so, when the armature 30 moves upwardly the end 37 is caused to move downwardly to cause an actuating member 40 to move downwardly through a bush 41 fixed to the horizontal part 28 of the support 25 and thus to engage with the external upper surface of the secondary shaft 16 to move it downwardly out of the torque transmitting position shown in FIGS. 3 and 3a into the position shown in FIGS. 4 and 4a where torque is not transmitted.

Such downward movement of the secondary shaft 16 continues until a lower part of its external surface engages a limit means 43 of, in the present example, generally semi-circular shape and fixed to the support 25. The limit means 43 comprises a generally semi-circular shaped shoe positioned so as to stop downward movement of the secondary shaft 16 when its axis is coaxial with the axis of the drive shaft 17. In this embodiment the armature 30 simply engages the part 36 of the lever 31 whilst the part 37 of the lever 31 simply engages the actuating member 40. When the solenoid 26 is de-energised the tension in the belt 14 causes movement of the secondary drive tube 16 upwardly from the position shown in FIGS. 4 and 4A to the position shown in FIGS. 3 and 3a and so the actuating member 40 remains in engagement with the rotating surface of the secondary shaft 16 and therefore over a period of time it may wear so that it then becomes shorter. Because of the fixed position of the limit means 43 such wear of the actuating member 40 is of no consequence as the throw of the solenoid 26 is adequate to compensate therefor.

Figure 6A:
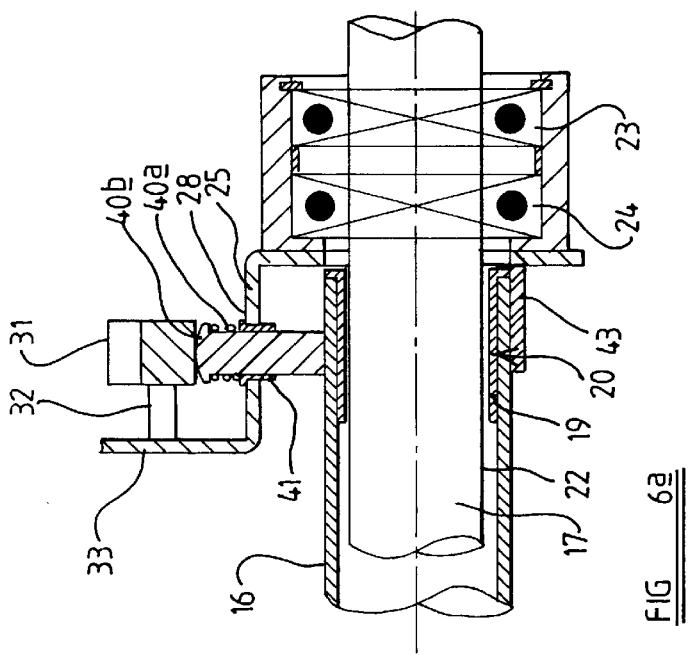
FIGS. 6 and 6a are figures similar to FIGS. 5 and 5a but showing the conveyor in a non-torque transmitting position.
Figure 6:
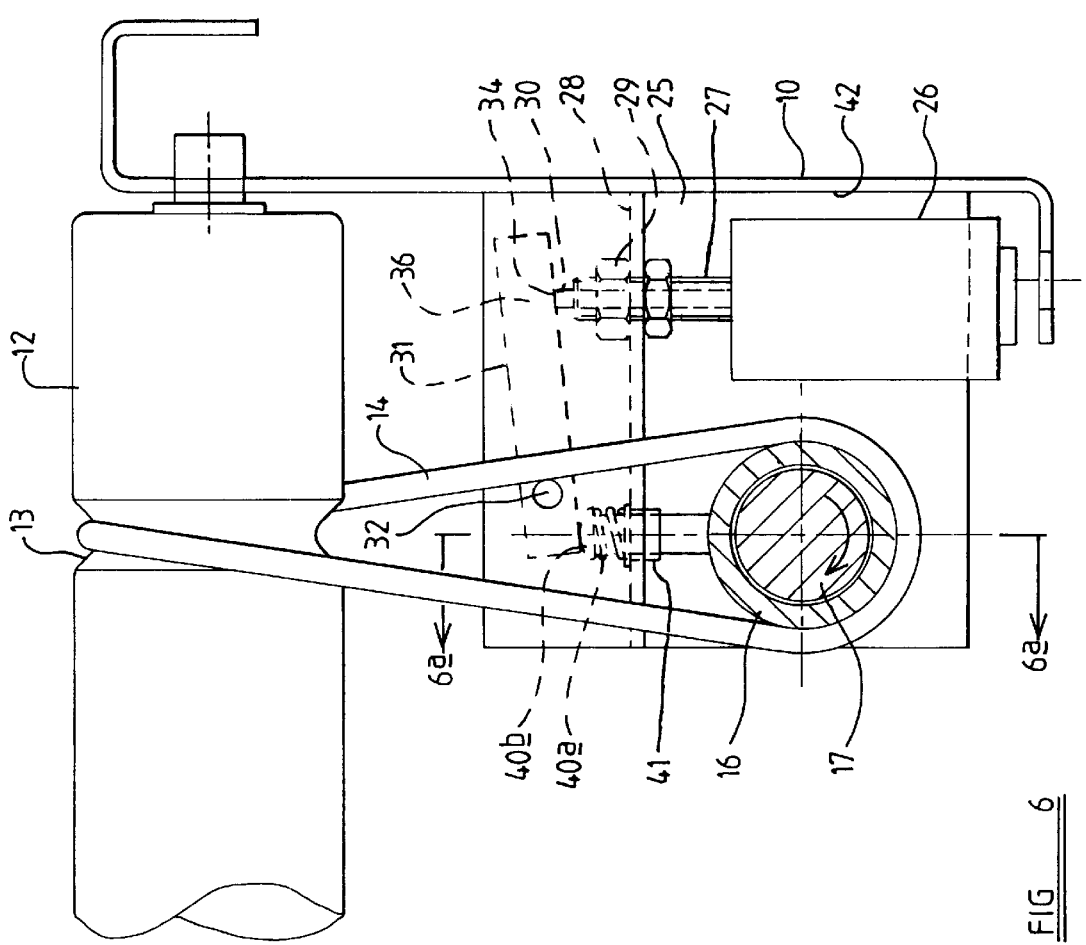
Figure 7:
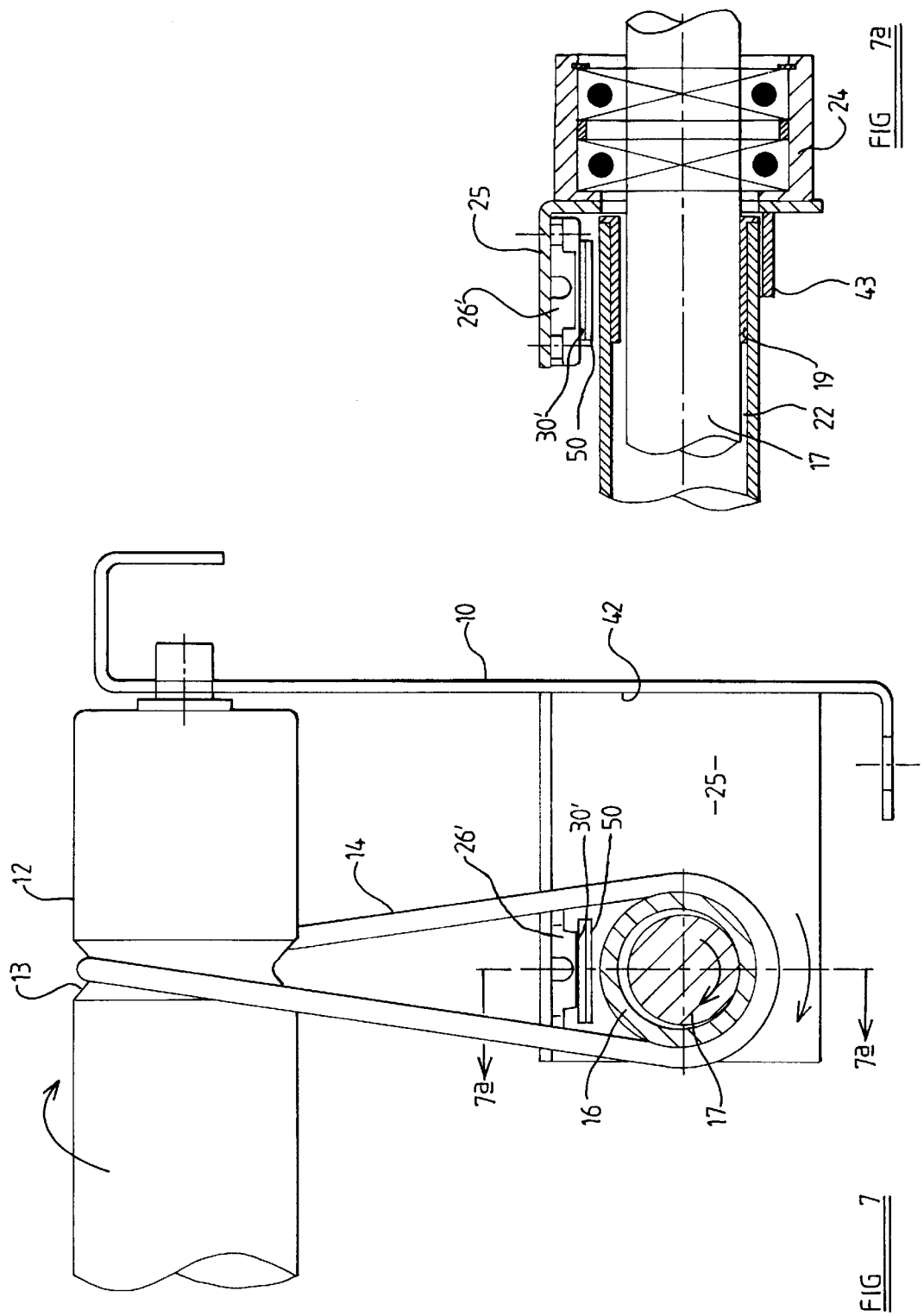
Figure 8:
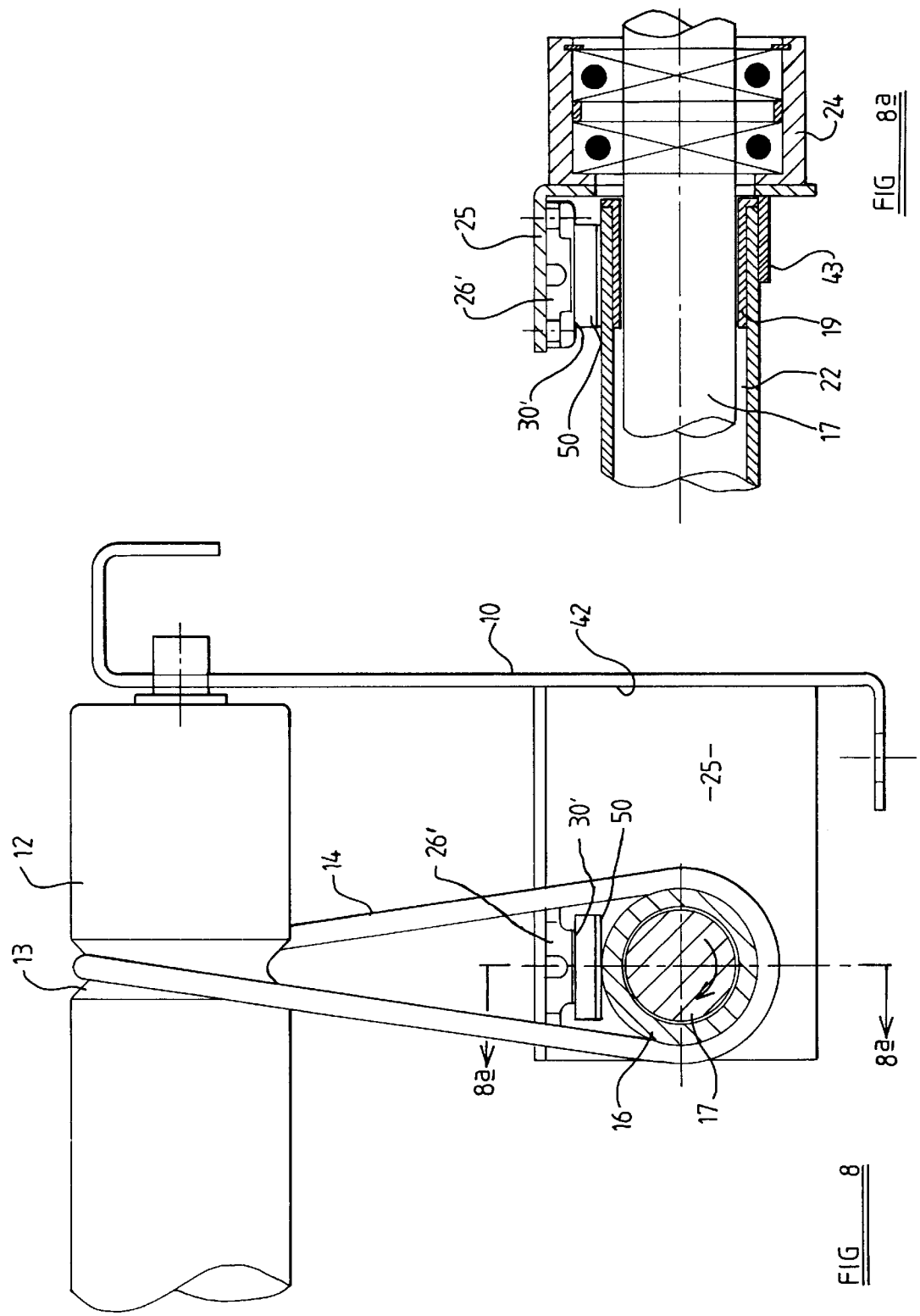

However, an alternative and preferred embodiment is shown in FIGS. 5 to 6a in which the same reference numerals have been used to refer to corresponding parts as were used in the previous figure and in which the manner of operation is as described in connection with the first embodiment except as described herein below.

In this embodiment, means such as a coil compression spring 40a are provided to engage an enlarged head 40b of the actuator member 40 and so lift the actuating member 40 out of engagement with the rotating shaft 16 when the solenoid is de-energised. As a result, wear of the actuator member 40 and/or of the shaft 16 does not occur. As a result, at least in this case, instead of the limit means 43 suitable locating means may be provided associated with the armature 30 or the lever 31 or the actuating member 40 or in any other desired manner so as to limit downward movement of the actuating member 40 and so limit the downward extent of movement of the secondary drive shaft 16 in this way.

In a further alternative embodiment shown in FIGS. 7, 7a and 8, 8a the same reference numerals are used as have been used in FIGS. 1 to 3a, 4 and 4a and refer to corresponding parts and the manner of operation is as described hereinbefore, except that in this case the actuating means instead of comprising a solenoid 26 comprises a pneumatically operated cylinder 26' having a piston 30' which engages a pad 50 which acts directly on the external surface of the secondary shaft 16 and so causes downward movement thereof in this way. Except for the provision of the pneumatically operated cylinder 26' on the underside of the horizontally extending pall of the support 25 and the omission of the vertically extending part 33 thereof and, of course, the lever 31 the embodiment is as described in connection with FIGS. 1 to 4a.

If desired suitable means may be provided to lift the pad 50 out of engagement with the shaft 16, analogous to the arrangement shown in FIGS. 3b and 3c to avoid wear of the pad 50 and/or shaft 60. In addition, by providing suitable locating means for the piston 26' limitation of downward movement of the secondary drive shaft 16 may be achieved in this way instead of by providing a shoe-shaped stop 43.

Although in the examples cited hereinbefore the solenoid and the pneumatically operated piston 26, 26' respectively have resulted in generally vertically downward movement of the secondary drive shaft 16 relative to the drive shaft 17, if desired these components may be arranged so as to cause relative movement between the shafts 16 and 17 in any other desired direction between a torque transmitting position analogous to that shown in FIGS. 3, 3a 5, 5a and 7, 7a and a position in which no torque is transmitted analogous to that shown in FIGS. 4, 4a and 6, 6a and 8, 8a.

A drive arrangement and control means as described hereinbefore is also provided at the opposite end of the relevant section of the said drive shaft so that the secondary drive shaft is acted upon by two actuating members at longitudinally spaced positions which, in the present example, are adjacent the ends thereof In both cases the vertical part 25 of the support is closely adjacent to so as to be in abutment with a vertical part 42 of the side members 10 so as to prevent rotation of the support 25 about the axis of the drive shaft 17.

Referring to FIGS. 9 to 12 of the drawings, an accumulation station of a powered roller conveyor according to a second embodiment of the invention is illustrated. The powered roller conveyor in like manner to the first embodiment of the invention comprises a frame having a pair of side members 110, at least one of the side members 110 being provided with a transversely extending member 111, a plurality of driven rollers 112 being rotatably mounted between the side members 110. As in the first aspect of the invention, the rollers 112 provide a conveyor surface for article to be conveyed by a conveying force supplied to the articles by the rollers 112. Each roller 112 is provided with a part-circular circumferential groove 113 in which, in some of the rollers 112, an elastomeric belt 114 of circular cross section is received. The elastomeric belt 114 is also engaged with a secondary shaft 116.

As in the first embodiment of the invention, the load on the belt 114 is such that friction is exerted between the shaft 116 and the belt 114 to such an extent as to provide a drive to the rollers 112 from the shaft 116 through the belts 114. If, however, any one or more of the rollers 112 is prevented from rotation that slipping occurs between the belt 114 and rollers 112 and/or the shaft 116 to permit rotation of the secondary shaft 116.

If desired, pulleys as discussed in connection with the first aspect of the invention may be mounted on the secondary shaft 116 and fixed relative thereto.

The secondary shaft 116 is tubular. Disposed within the secondary shaft 116 is a main drive shaft 117 mounted for rotation about a longitudinally extending axis. In the current example, the shaft 117 is a solid shaft but may if desired be a tubular shaft.

Mounted on the shaft 117 is a bush 119 comprising an outer part 119a which preferably comprises clewthane, but may comprise polyacetal, or any other suitable material. The outer part 119a is held on the shaft 117 by a spacer 119b. The diameter of the bush 119 is that the inner surface of the secondary shaft 116 is a clearance fit on the bush 119. The bush 119 provides a friction drive means between the main drive shaft 117 and the secondary drive shaft 116.

The main drive shaft 117 may comprise any features discussed in connection with the main drive shaft 117 in the first embodiment of the invention hereinbefore as desired.

In order to move the secondary drive shaft 116 relative to the main drive shaft 117 a control means generally indicated at 120 is provided. The main drive shaft 117 is received within a sleeve 121, the sleeve 121 being carried within a housing 122. Between the sleeve 121 and the housing 122 are provided a pair of ball or roller bearings 123. The housing 122 is attached to a support member 125, for example by welding. Mounted on a horizontally extending part of the support member 125 is an actuating means comprising a pneumatically operated cylinder 126. The pneumatically operated cylinder 126 is provided with an actuating member comprising a piston rod 127 at the end of which is a pad 128 which acts directly on the external surface of the secondary drive shaft 116. The pad 128 may comprise an oil impregnated plastic bar or any other material as desired.

The support member 125 is mounted on the transverse member 111 by means of bolts 129.

Provided on the housing 122 is a limit means 130 in the form of a stop member comprising, in the present example, a semi-circular shaped shoe. The limit means 130 is positioned so as to stop downward movement of the secondary shaft 116 when its longitudinal axis is co-axial with the axis of the drive shaft 117. In the present example the limit means 130 is integrally provided on the housing 122, but may be provided separately and attached thereto. The bearings 123 serve to support the drive shaft 117 and to ensure the correct relative positions of the drive shaft 117 and limit means 130.

To maintain the secondary drive shaft 116 in a desired position in a longitudinal direction, a disc 131 is attached to the secondary drive shaft 116 part way along its length. The disc 131 is received in bearings 132 provided on a support (not shown) attached to a side member 110 of frame. The disc 131 may be omitted, or one or more such discs may be located anywhere as desired on the length of the secondary drive shaft 116.

Figure 9:
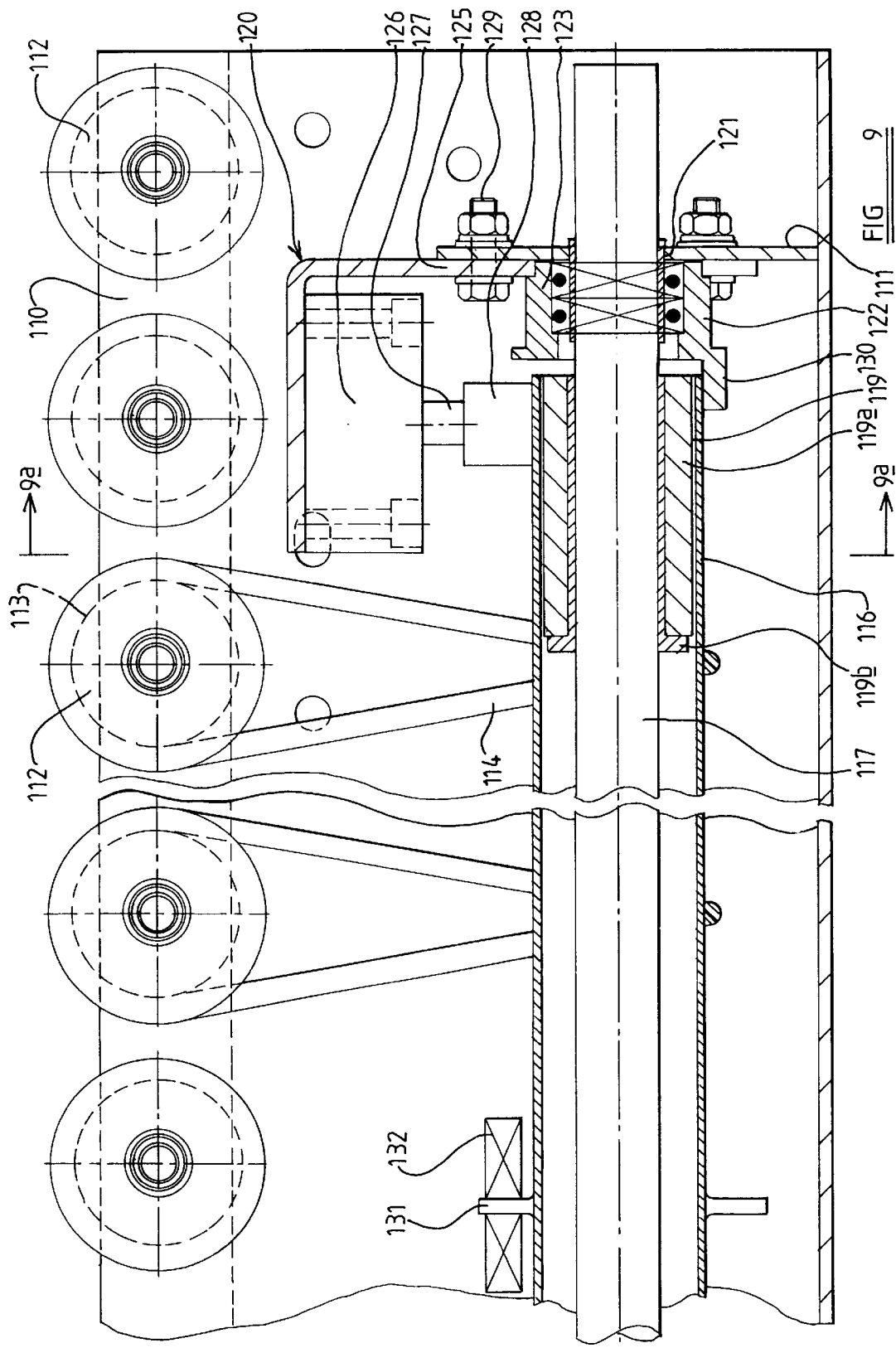
FIG. 9 is a side elevation in part section of a live roller conveyor according to a second embodiment of the invention in a non-torque transmitting position.
Figure 9A:
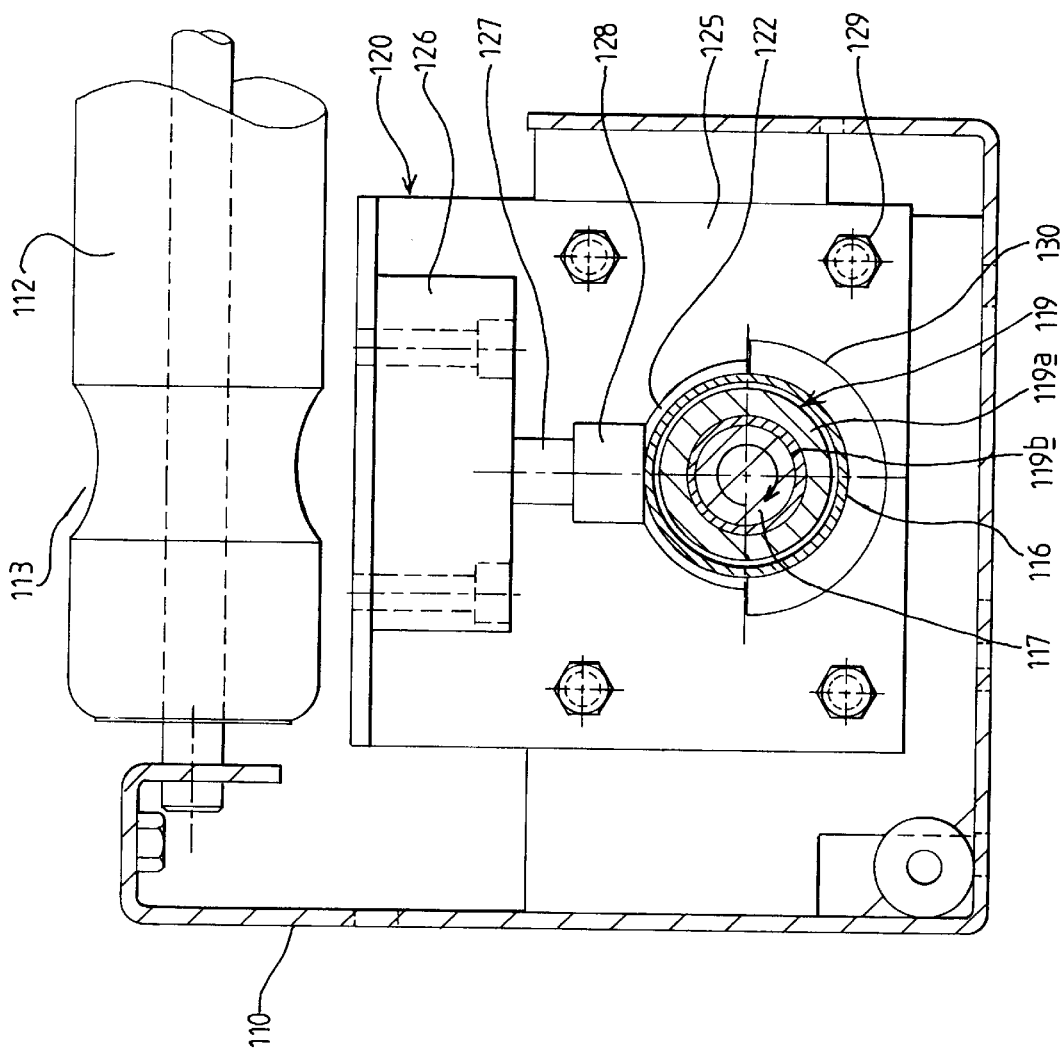
FIG. 9a is a section on the line 9a of FIG. 9.

As seen in FIGS. 9 and 9a, when it is desired to stop the rollers, the pneumatic cylinder 126 is actuated to move the piston rod 127 in a downward direction such that the pad 128 acts on an outer surface of the secondary shaft 116. The secondary shaft 116 is urged downwards into engagement with the limit means 130, which ensures that the secondary shaft 116 is generally concentric with the main drive shaft 117 and that there is a clearance between the outer surface of the bush 119 and the inner surface of the sleeve 116. The drive shaft 117 thus may still rotate, but because there is no engagement between the bush 119 and the inner surface of the secondary sleeve shaft 116, the rollers 112 are not driven.

Figure 10A:
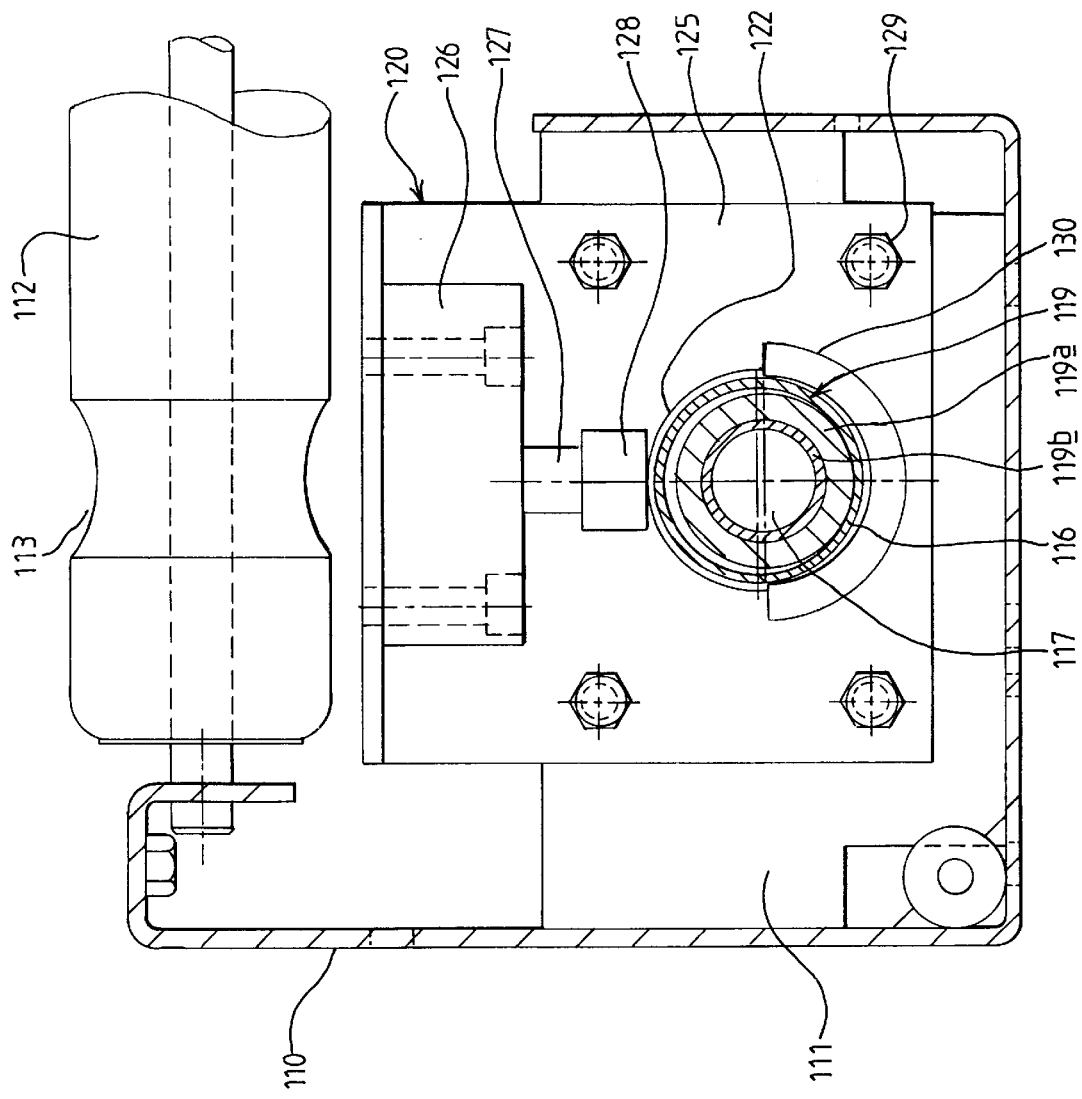

When it is desired to operate the rollers, the pneumatic piston 126 is operated that the piston rod 127 is moved upwardly. The tension of the belts 114 lifts the secondary drive shaft 116 upwardly away from the limit means 130 and such that the inner face of the secondary drive tube 116 comes into contact with the bush 119, as seen in FIGS. 10 and 10a.

Figure 11:
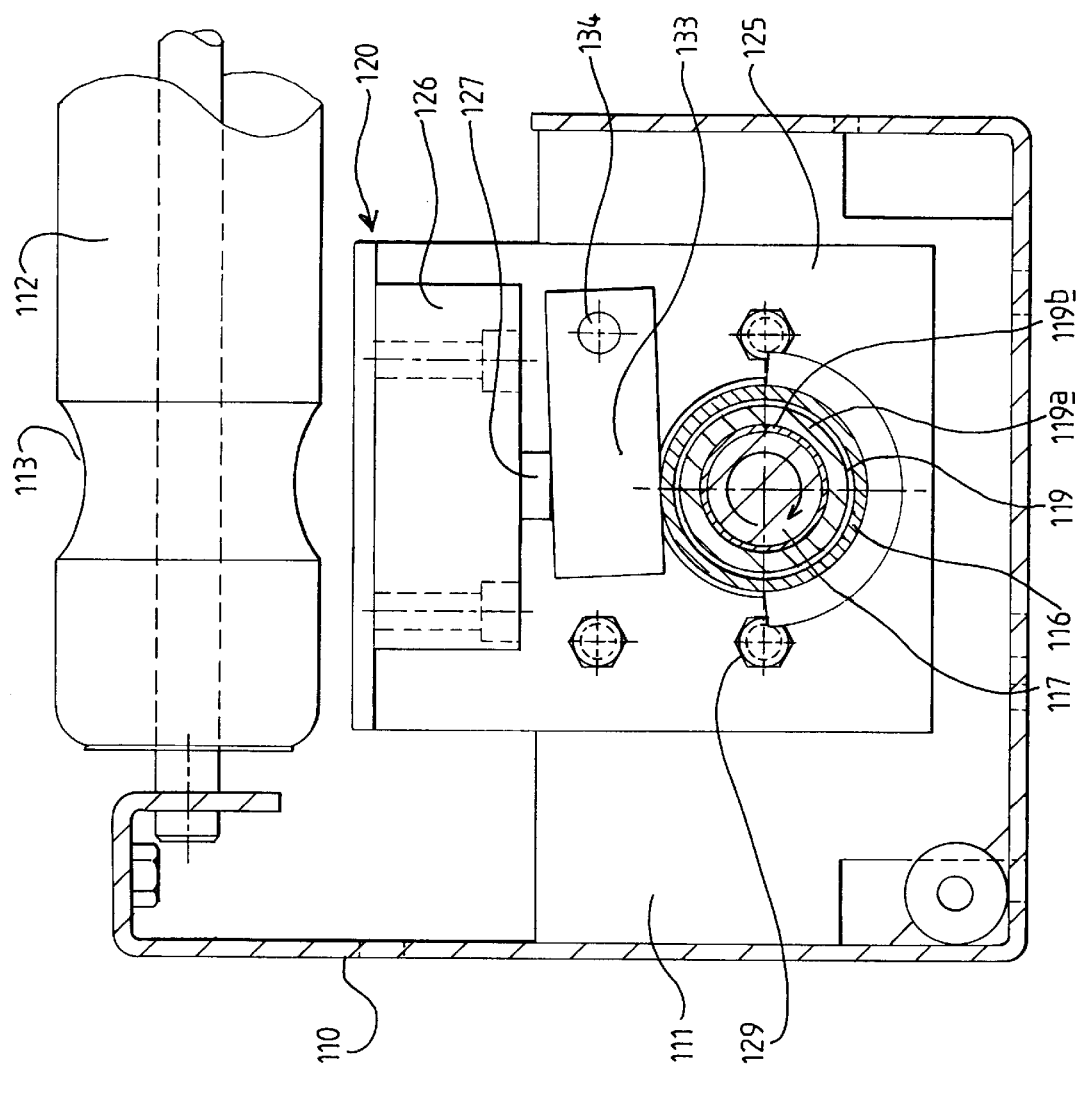
FIG. 11 is an alternative configuration of part of the conveyor of FIG. 9.
Figure 12:
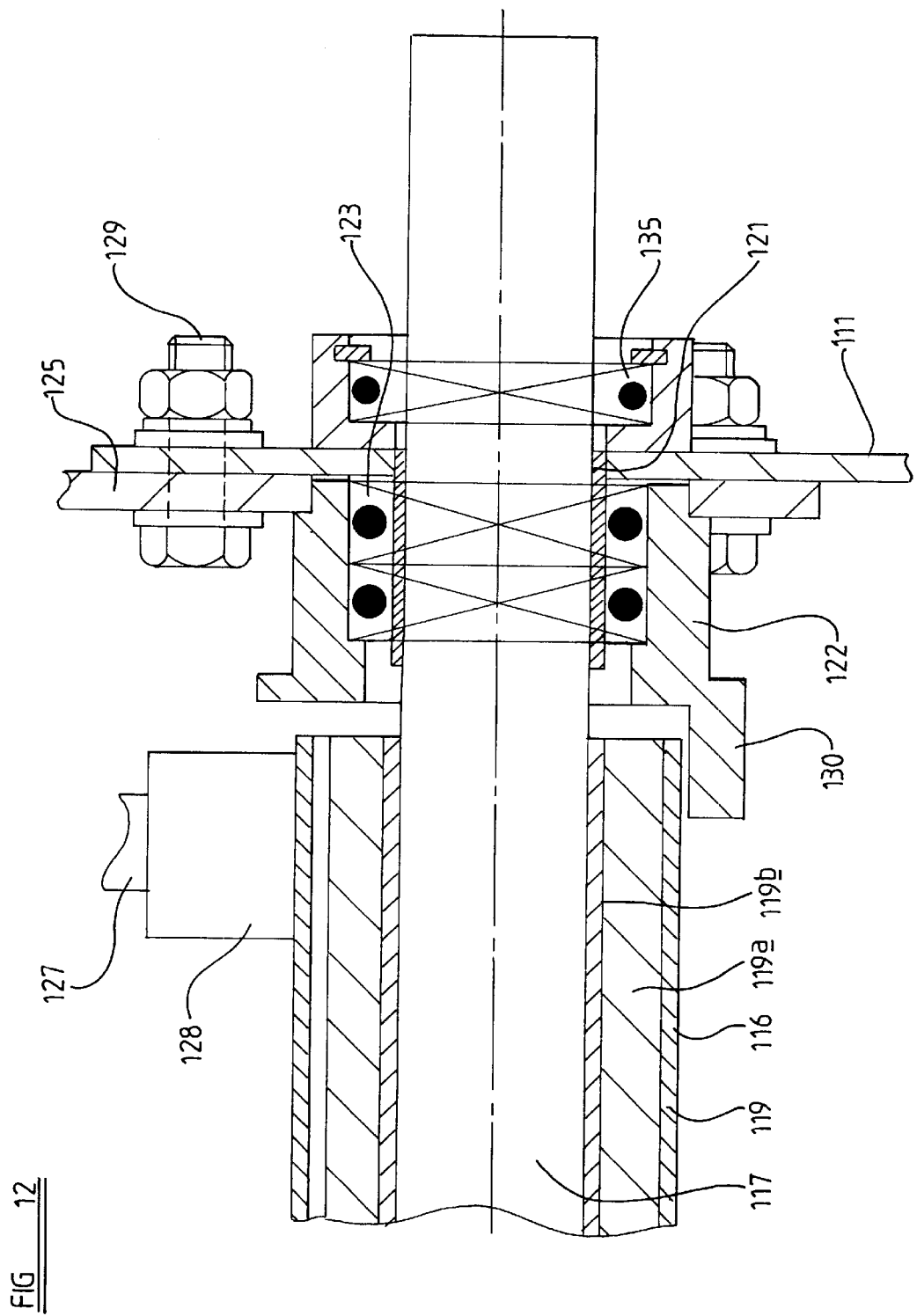
FIG. 12 is an, alternative configuration of a further part of the conveyor of FIG. 9.
Figure 13:
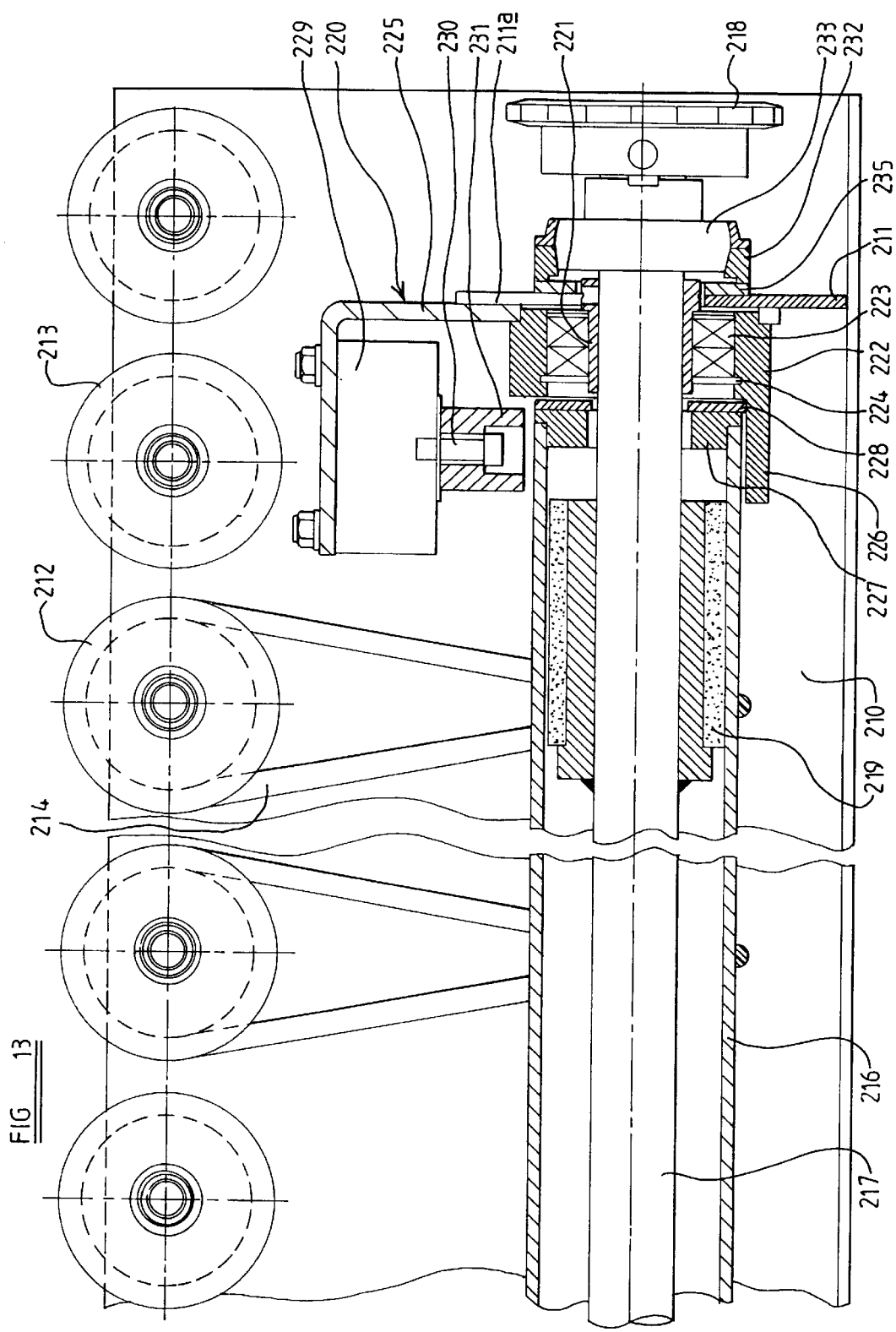
FIG. 13 is a side elevation in part section of a further live roller conveyor according to the first embodiment of the invention.

In an alternative configuration as shown in FIG. 11, the pad 128 may be replaced by a block 133 which is pivotally attached to the support means 125 by a suitable pivot 134. The piston rod 127 of the pneumatic piston 126 acts on the pad 133 at a point removed from the pivot 134 to urge the block 133 downwardly against the secondary drive shaft 116, moving the shaft in a downward direction as hereinbefore described.

If desired, in a second variant of the second alternative of the invention the drive shaft 117 is received in a further bearing 135 mounted on the cross member 111. In this alternative, the drive shaft 117 is carried principally on the further bearing 135. The bearings 123 serve to align the housing 122 and consequently the stop 130 relative to the drive shaft 117 without also providing the main support for the drive shaft 117 as in the first alternative of the second aspect of the invention. The further bearing 135 preferably comprises a self aligning bearing to simplify alignment of the drive shaft 117 and secondary drive shaft 116. In this alterative, the drive shaft 117 is mounted in the bearings 135, 123 before the bolts 129 are tightened to their operating position. Once the drive shaft 117 has been installed in place and has taken up its correct aligned position by virtue of the self aligning further bearing 135, the housing 122 and support member 125 will then be in the correct position by virtue of the engagement of the bearings 123 and the main drive shaft 117, and the bolts 129 can be fully tightened.

As discussed in relation to the first embodiment of the invention, the conveyor may be provided with a suitable sensing device to sense the presence of the or any desired number of articles at an accumulation station. The sensing means may cause the control means 120 to disengage the drive between the main drive shaft 116 and the main drive shaft 117. As discussed hereinbefore, the conveyor may be provided with an arresting means.

It will be appreciated that in either embodiment of the invention, the bush may be provided mounted on either the secondary drive shaft or the main drive shaft. If desired, the pneumatic cylinder 126 may comprise some other actuator, such as an electrical operated solenoid as described with reference to the first aspect of the invention.

FIGS. 13 to 16 of the drawings show a live roller conveyor similar to that shown in FIGS. 9 to 12, but according to the first embodiment of the invention rather than the second.

In like manner to the powered roller conveyor of FIGS. 9 to 12, the conveyor of FIGS. 13 to 16 comprises a frame having side members 210, at least one of the side members 210 being provided with a transversely extending member 211 a plurality of driven rollers 212 being rotatably mounted between the side members 210. The rollers 212 provide a conveyor surface for articles to be conveyed by the rollers 212. Each roller 212 is provided with a part-circular circumferential groove 213 in which, in some of the rollers 212, an elastomeric belt 214 of circular cross section is received.

In like manner to the various configurations of a live roller conveyor discussed above, the elastomeric belt 214 is engaged with a secondary shaft 216. The load on the belts 214 is such that the friction exerted between the shaft 216 and the belts 214 is such as to provide a drive to the rollers 212 from the shaft 216 through the belts 214, in a such way as to permit slipping between the belt 214 and rollers 212 and/or the shaft 216. The secondary shaft 216 is tubular and disposed therewithin is a main drive shaft 217 mounted for rotation about a longitudinally extending axis. As in the configurations discussed above, in the present example the shaft 217 is a solid shaft but may if desired be a tubular shaft.

Mounted on the main drive shaft 217 is a bush 219 comprising an outer part 219a which preferably comprises clewthane but may comprise polyacetal or any other suitable material. The outer pail 219a is held on the, shaft 217 by a spacer 219b the spacer 219b having an outwardly extending flange part 219c to limit longitudinal movement of the outer part 219a. A sprocket 218 is provided at the end of the main drive shaft 217 and non-rotatably keyed thereto, such that the main drive shaft 217 may be connected by a suitable coupling chain to a sprocket 218 of a further main drive shaft, or may be connected to a suitable drive means as desired. It would be apparent that a sprocket 218 could be provided in any embodiment, alternative or configuration of the invention discussed herein.

A control means 220 is provided, comprising a sleeve 221 mounted on the main drive shaft 217 and non-rotatably keyed thereto by a grub screw 221a. The sleeve 221 comprises a portion 221b having a relatively large diameter and a portion 221c having a relatively small diameter. A housing 222 is disposed concentric with the main drive shaft 217 and the sleeve 221. A pair of bearings 223 are disposed between the housing 222 and the sleeve 221. The housing 222 is connected to an upwardly extending support 225 and is non-rotatably connected thereto, for example by welding. The housing 222 comprises a limit means 226 in the form of a stop member comprising, in the present example, a semicircular shaped shoe. The limit means 226 extends from the housing 222 in a direction away from the support 225 such that the limit means 226 extends beneath a part of the secondary drive shaft 216. The bearings 223 are retained within the housing 222 by means of a circlip 224 and the portion of relatively large diameter 221b of the sleeve 221.

Received in the end of the secondary shaft 216 is an end cap 227. The end cap 227 has a first part of relatively small diameter 227a which is received within the second drive shaft 216 and a portion of relatively large diameter 227b which has the same diameter as the outer diameter of the secondary drive shaft 216 and covers the end face thereof. Disposed between the end cap 227 and the housing 222 is a hardened washer 228. The end cap 227 preferably comprises nylon.

To move the secondary drive shaft 216 between a torque transmitting and a non-torque transmitting position an actuating means is provided comprising a pneumatic cylinder 229 mounted on a transversely extending part 225a of the support means 225. The pneumatic cylinder comprises an actuating member comprising a piston rod 230 on which is mounted a piston rod cap 231.

A bearing housing 232 provided on the opposite side of the transverse member 211 to the control means 220. Mounted within the bearing housing 232 is a self aligning bearing 233 which engages the main drive shaft 217. The housing 232 is mounted on a bearing mounting plate 235 by threaded bolts 236 extending from the mounting plate 235 which pass through apertures in the bearing housing 232 and on which nuts 237 are received to hold the plate 235 and bearing housing 232 fixedly in position relative to one another.

To constrain the movement of the control means 220, a pair of threaded bolts 238 are provided disposed one towards each side of the support 225 which pass through apertures 239a, 239b and 239c provided respectively in the bearing mounting plate 235, the transverse member 211 and the support 225. The diameter of the apertures 239c is greater than that of the apertures 239b, 239a and of the bolts 238 such that the support 225 is able to move relative to the transverse member 211, its range of movement being constrained by bolts 238. A nut 240, preferably made of nylon, is received on each bolt 238 such that movement of the support 225 in a direction longitudinally of the bolts 238 is constrained. Each aperture 239b in the transverse member 211 is threaded to receive a respective bolt 238 to hold the bearing mounting plate 235 firmly adjacent the transverse member 211.

The transverse member 211 is preferably provided with a vertically extending slot 211a having a part circular "mousehole" shape to the bottom thereof This vertical slot 211a permits the whole assembly of the control means 220 and bearing housing 223 to be mounted on the main drive shaft 217 and dropped vertically into position. The only step then required is to insert the bolts 238 through apertures 239a, 239b, 239c and attach the nuts 240.

At the other end of the main drive shaft 217, the shaft is similarly received in a transverse member and is provided with a control means 220 and bearing housing and bearing 233 in like manner, such that the main drive shaft 217 is supported at each end in a self aligning bearing and a control means 220 is provided at each end of the main drive shaft 217.

Such a configuration thus helps to overcome any difficulties involved in aligning such a powered roller conveyor. The self aligning bearing 233 permits the main drive shaft 217 to take up a preferred position. The limit means 226 is held concentric with the main drive shaft 217 by virtue of the engagement of the housing 222, bearings 223 and sleeve 221 with the main drive shaft 217. There is thus no separate requirement to ensure the support means 225 is correctly aligned. The fact that the main drive shaft 217 is self aligning and adopts a preferred position reduces wear on the belts 214 and on the drive means driving the shaft 217.

Longitudinal movement of the secondary drive shaft 216 is constrained by the nylon end cap 227 and the hardened washer 228. This ensures that any longitudinal pressure from the belts 214 is received by the washer and end cap and is not transferred to the bearings 213, 233.

Figure 14:
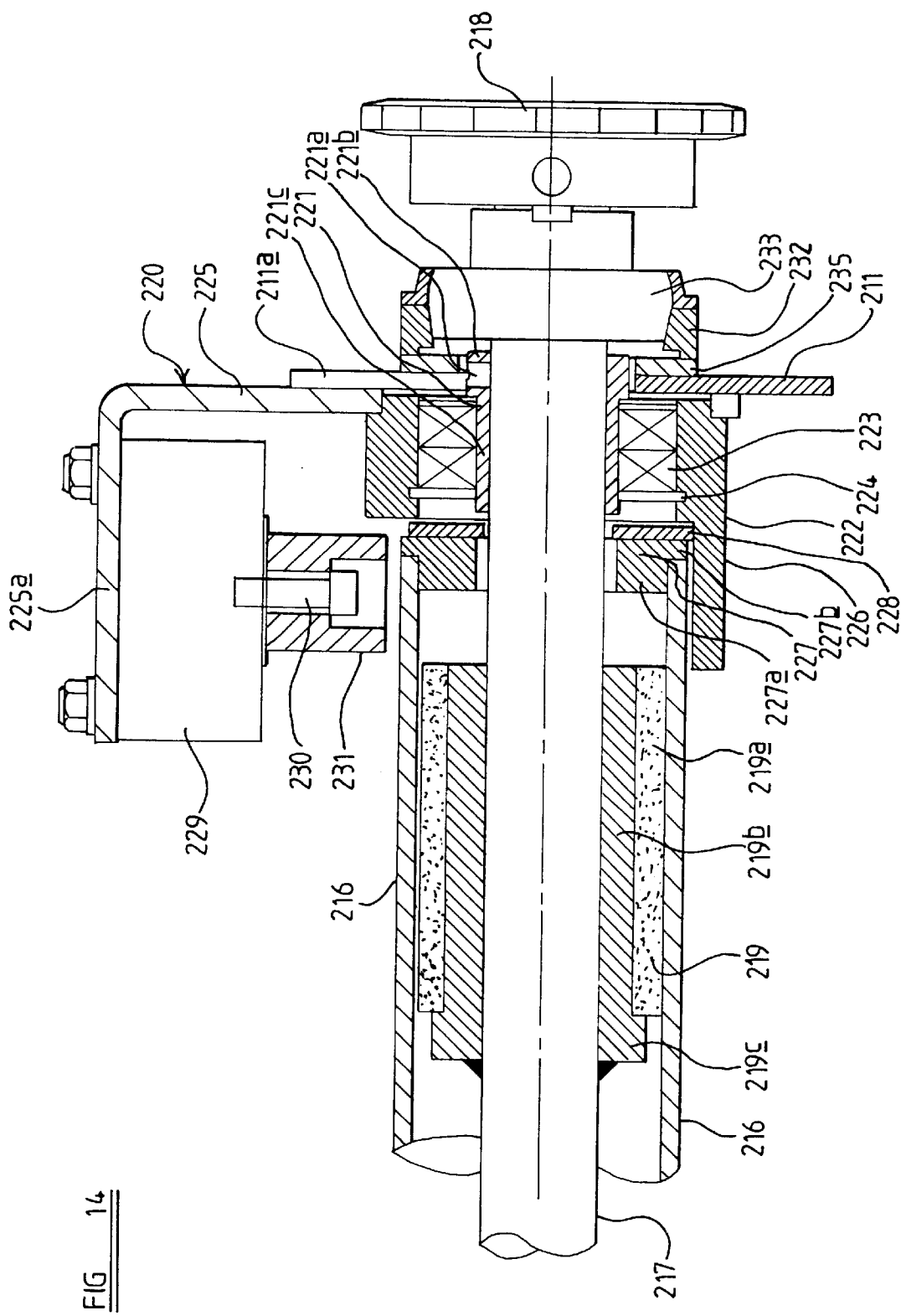
FIG. 14 is a view of part of the conveyor of FIG. 13 to a larger scale in a torque-transmitting position.
Figure 15:
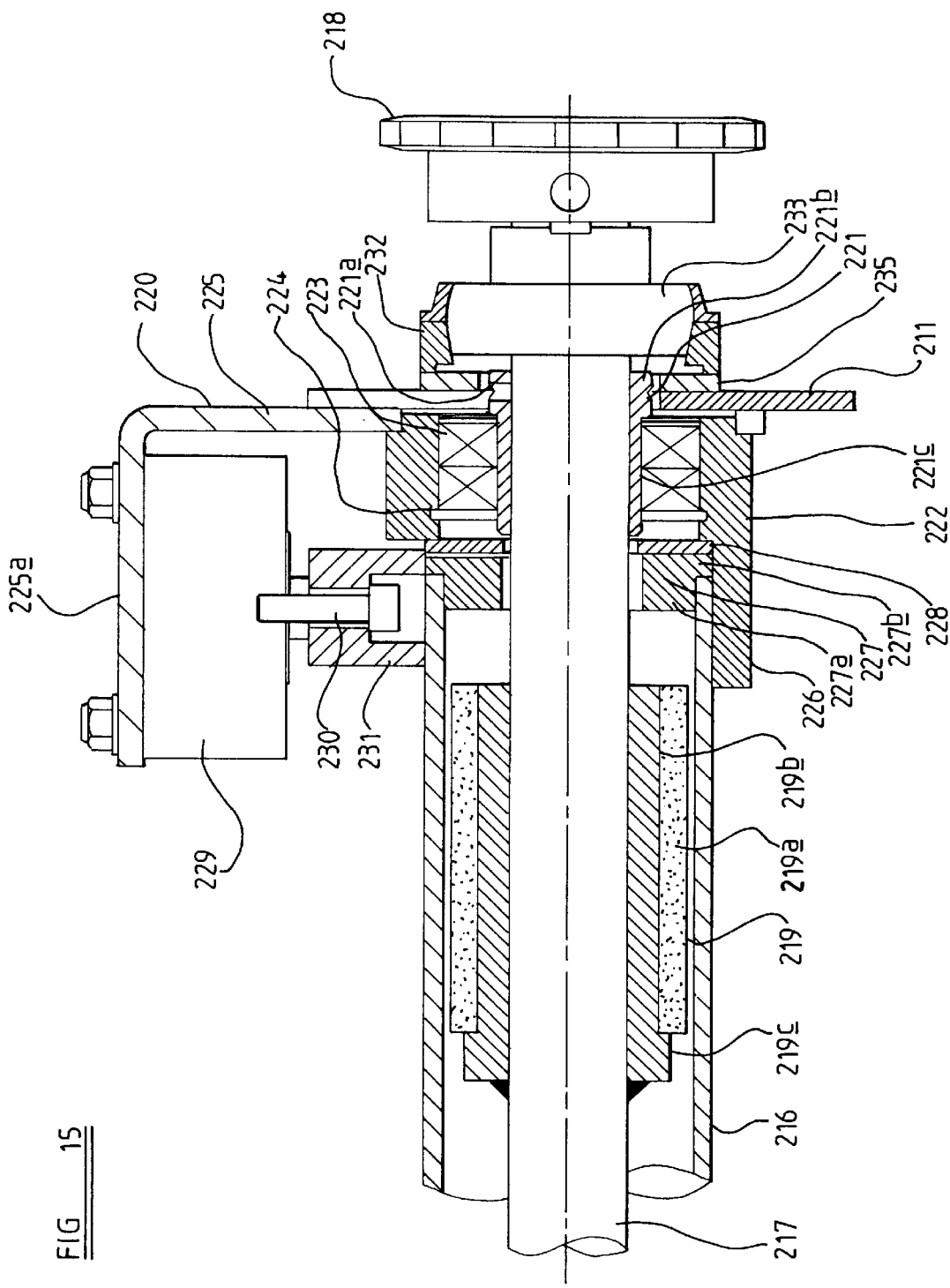
FIG. 15 is a similar to FIG. 14 but showing the conveyor in a non-torque-transmitting position.

As seen in FIGS. 14 and 15, to drive the rollers 212, the pneumatically operated cylinder 219 is actuated to withdraw the piston rod 230 and hence the piston rod cap 231 out of engagement with the secondary drive shaft 216. The tension of the belts 214 acts to move the shaft 216 in an upwardly direction transverse to the longitudinal axis of the main drive 217, such that an internal face of the secondary drive shaft 216 comes into contact with the bush 219. To move the secondary drive shaft 216 into a non-torque transmitting position, the cylinder 229 is actuated to urge the piston rod 230 and piston rod cap 231 downwards into engagement with the secondary drive shaft 216, urging the secondary drive shaft 216 downwards such that it engages the limit means 226. Because the limit means 226 is part circular and concentric with the main drive shaft 217, the secondary drive shaft 216 is thus held in a position concentric with the main drive shaft 217 and spaced from the bush 219.

It will be apparent that any feature of the conveyor of FIGS. 13 to 16 may be used in connection with any of the configurations of FIGS. 1 to 12 as desired or as appropriate, and vice versa.

Any features of a conveyor according to the first embodiment of the invention may be incorporated, as desired, into a conveyor according to the second embodiment of the invention, and vice versa.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A live roller conveyor comprising a plurality of rollers driven by friction drive from a main drive shaft wherein at least some of said rollers are driven from the main drive shaft through a secondary drive shaft, a control means to vary the torque transmitted between the main drive shaft and the secondary drive shaft, the main drive shaft disposed within the secondary drive shaft, the secondary drive shaft being movable relative to the main drive shaft so as to vary torque transmitting frictional engagement therebetween, the secondary drive shaft including alignment means to restrain longitudinal movement of the secondary drive shaft, and wherein the alignment means comprises a disc attached to said secondary drive shaft transverse to the longitudinal axis thereof, said disc being received in bearings attached relative to a frame of the conveyor.

2. A conveyor according to claim 1 wherein the secondary drive shaft is displaced out of driving engagement with the main drive shaft by movement of the secondary drive shaft in a downward direction transversely relative to the main drive shaft.

3. A conveyor according to claim 1 wherein said movement of the secondary drive shaft is as a result of engagement of the secondary drive shaft by an actuating member of the control means.

4. A conveyor according to claim 3 wherein the control means comprises a support and the actuating member is movable relative to the support.

5. A conveyor according to claim 4 wherein the support comprises a bearing which engages the main drive shaft.

6. A conveyor according to claim 3 wherein the actuating member is driven by the actuating means of the control means.

7. A conveyor according to claim 6 wherein the actuating member is driven by the actuating means by virtue of the actuating means acting directly on the actuating member.

8. A conveyor according to claim 6 wherein the actuating member comprises a fluid operated cylinder or a solenoid.

9. A conveyor according to claim 8 wherein the control means comprises a support and the actuating member is movable relative to the support and the actuating means is carried on said support.

10. A conveyor according to claim 9 wherein the actuating member comprises an end part of, or an element attached to, a piston of a fluid operated actuating means.

11. A live roller conveyor comprising a plurality of rollers driven by friction drive from a main drive shaft wherein at least some of said rollers are driven from the main drive shaft through a secondary drive shaft, a control means to vary the torque transmitted between the main drive shaft and the secondary drive shaft, the main drive shaft disposed within the secondary drive shaft, the secondary drive shaft being movable relative to the main drive shaft so as to vary torque transmitting frictional engagement therebetween, the secondary drive shaft including alignment means to restrain longitudinal movement of the secondary drive shaft, and wherein the alignment means comprises an end part of said secondary drive shaft which engages a washer disposed between said end part and said control means.

12. A conveyor according to claim 11 wherein the secondary drive shaft is moveable between a position in which the axes of rotation of the drive shafts are mutually offset and a position in which the axes are coaxial or substantially coaxial to vary the frictional torque transmission therebetween.

13. A conveyor according to claim 11 wherein the rollers are rotatably mounted on a frame so as to extend generally transversely to the direction of advance of an article to be conveyed thereby whilst the main drive shaft is also mounted on the frame but in a direction so as to extend generally longitudinally of said direction of advance of the articles.

14. A live roller conveyor comprising:
a plurality of rollers mounted to a frame;
a secondary drive shaft operatively connected to the plurality of rollers and arranged to transmit rotation to the plurality of rollers;
a main drive shaft disposed inside of the secondary drive shaft, the secondary drive shaft shiftable relative to the main drive shaft between an engaged position in which the secondary drive shaft is positioned in frictional engagement with the main drive shaft such that the secondary drive shaft receives driving torque from the main drive shaft and a disengaged position in which the secondary drive shaft is positioned out of frictional engagement with the main drive shaft;
a stop positioned to be engaged by the secondary drive shaft when the secondary drive shaft is in the disengaged position, the stop shaped to limit lateral movement of the secondary drive shaft relative to the axis of the main drive shaft as the secondary drive shaft is shifted toward the disengaged position, the stop further supported relative to the main drive shaft to define a limit on the vertical movement of the secondary drive shaft as the secondary drive shaft is shifted to the disengaged position;
an actuator arranged to shift the secondary drive shaft between the engaged and disengaged positions; and
an alignment washer positioned to engage an end portion of the secondary drive shaft, the alignment washer arranged to limit longitudinal movement of the secondary drive shaft.

15. The device of claim 14, wherein the stop is curved and sized to receive a curved portion of the outer surface of the secondary drive shaft when the secondary drive shaft is in the disengaged position.

16. The device of claim 14, wherein the stop defines means for limiting lateral movement of the secondary drive shaft as the secondary drive shaft is shifted toward the disengaged position, the means for limiting lateral movement being exclusive of contact between the main drive shaft and the secondary drive shaft.

17. A conveyor according to claim 14 wherein the stop is fixed.

18. A conveyor according to claim 17 wherein the support comprises a bearing which engages the main drive shaft and the stop member is held in a position relative to said main drive shaft by virtue of engagement of the bearing with the main drive shaft.

19. A conveyor according to claim 14 wherein the secondary drive shaft is moved relative to the main drive shaft by two actuators disposed at two longitudinally spaced positions of the secondary drive shaft.

20. A conveyor according to claim 19 wherein said longitudinally spaced positions are adjacent opposite ends of the secondary drive shaft.

21. A conveyor according to claim 14 including a friction drive for driving at least some of said rollers, wherein the friction drive comprises an elastomeric belt engaged with at least one of said rollers and with the secondary drive shaft either directly or through an intermediate member which is frictionally rotatably mounted on the secondary drive shaft.

22. A conveyor according to claim 14 wherein at least some of the plurality of rollers are driven from the main drive shaft by a friction drive means which comprises an elastomeric belt engaged with each of said at least some rollers and with the main drive shaft either directly or through an intermediate member frictionally rotatably mounted on the main drive shaft.

* * * * *

UNITED STATES PATENT AND TRADEMARK OFFICE
CERTIFICATE OF CORRECTION

PATENT NO. : 6,598,735 B1
DATED : July 29, 2003
INVENTOR(S) : Edward W. Toye

It is certified that error appears in the above-identified patent and that said Letters Patent is hereby corrected as shown below:

Title page,
Item [54], Title, should read -- IMPROVEMENTS RELATING TO LIVE ROLLER CONVEYORS --
Item [30], Foreign Application Priorty Data, please add -- GB 9917967.3, filing date 31 July 1999. --

Signed and Sealed this

Twenty-third Day of March, 2004

JON W. DUDAS
*Acting Director of the United States Patent and Trademark Office*